3,449,322
ALKALINE EARTH METAL SALTS OF STARCH-SULTONE REACTION PRODUCTS AND PROCESSES FOR PREPARATION THEREOF
Lee H. Elizer, Keokuk, Iowa, assignor to The Hubinger Company, Keokuk, Iowa, a corporation of Iowa
No Drawing. Filed Feb. 25, 1966, Ser. No. 529,930
Int. Cl. C08b 25/02
U.S. Cl. 260—233.3               11 Claims

ABSTRACT OF THE DISCLOSURE

Reaction of starch or starch fractions with alkyl or aryl sultones at 35–120° F. and alkaline pH in presence of 0.8–3 mol equivalent of alkaline earth metal base per mol of reacted sultone to increase reaction efficiency and produce alkaline earth metal salts of ether sulfonic acids of starch or fraction thereof.

---

This invention pertains to improvements in starch-sultone reaction products and to their preparation and, more particularly, pertains to process improvements wherein the pH of the starch suspension is maintained in the alkaline range during the reaction of the starch and the sultone by an alkaline earth metal base. The invention further pertains to the products resulting therefrom, i.e., alkaline earth metal salts of the resultant sulfoalkyl or sulfoaryl groups added to the starch by the sultone-starch reaction.

Sultone-starch reactions in aqueous starch suspensions rendered alkaline by sodium hydroxide are described in U.S. Patent No. 3,046,272, issued July 24, 1962. The sultone-starch reaction herein is concerned with improvements in the reaction efficiency with relation to reaction of the sultone and starch in terms of amount of sulfoalkyl or sulfoaryl groups reacted per 100 anhydroglucose units of the starch. The hydroxides (or oxides which form or act like the hydroxides in water) of calcium, barium and strontium are eminently suited for this purpose, and yield the corresponding alkaline earth metal salts of the sultone-starch reaction product. The quantities of said alkaline earth metal bases are approximately stoichiometric for formation of the alkaline earth metal salts of the sulfonic acid groups provided by the sultone. Preferably the alkaline earth metal salt is employed in quantities in the order of 0.8–1.1 mol equivalent of the alkaline earth metal base per mol of reacted sultone. Excess amounts above the 1.1 mol equivalent can be used, if desired, e.g., up to 2 or 3 mol equivalent, but there is little to be gained by using such excess. The pH of the starch slurry containing the alkaline earth metal base during the starch-sultone reaction is in the range of about 10–12, preferably about 10.5–11.5.

The starches useful herein may be any ungelatinized starch or fraction thereof. The starches are preferably natural starches, but the generic invention embraces modified starches such as dextrinized, hydrolyzed, oxidized, etherified or fractionated starch (amylose and amylopectin). The starch may be of any origin; examples are corn starch, wheat starch, potato starch, tapioca starch, waxy corn starch, sago starch or rice starch.

Sultones are intramolecular cyclic esters of hydroxysulphonic acids and may be derived both from aliphatic and from aromatic sulphonic acids. Examples of sultones suitable for the present purpose are 1,3-propanesultone, 1,4-butanesultone, mixtures of isomeric butanesultones (which may be prepared from mixtures of chlorobutanesulphonic acids, obtained by sulfochlorination of 1-chlorobutane), benzylsultone and tolylsultone. The preferred reagents are γ-sultones. The alkyl sultones are lower alkyl sultones with at least 3 carbons while the aryl sultones are preferably phenyl sultones or lower alky phenyl sultones having 1–4 carbon alkyl groups.

The reaction is conducted by adding the sultone to an aqueous slurry of the ungelatinized starch at about 35–120° F., said slurry containing an alkaline earth metal base such as the hydroxides of calcium, barium or strontium. Room or ambient temperature is satisfactory. The amount of sultone added preferably is in the range of about 1.5 to 5.0 mols of sultone per 100 anhydroglucose units of the starch. The reaction provides a rapid process for producing highly substituted starch ether sulfonic acid salts of the respective alkaline earth metals by the reaction of the sultone with hydroxyl groups of the starch.

The alkaline earth metal salts of said starch ether sulfonic acids have proven especially suitable as sizing and/or finishing agents for textiles or yarn. They function well with diverse types of natural fiber and synthetic fiber textiles or yarns such as cotton, nylons, polyesters (e.g., terephthalic acid-ethylene glycol polyester), polyacrylonitrile, rayons, and other synthetic fibers.

The introduction of very small proportions of the sulfoalkyl or sulfoaryl groups into the ungelatinized starch and the formation of the alkaline earth metal salts thereof, notably the calcium, barium or strontium salts, provide improvements in aqueous starch dispersions or slurries of the dried starch in regard to viscosity, clarity and stability.

The following comparisons illustrate advantages afforded by the invention.

A slurry of 5000 grams of starch in five liters of water was diluted with water to ten liters and divided into five equal parts. Twenty-five mls. of the resultant starch slurry had an acidity requiring 2.7 mls. of 0.1 N alkali to neutralize (hereinafter designated alkalinity or acidity equivalent to the stated mls. of 0.1 N acid or alkali, respectively, per 25 mls. of starch slurry). The slurry had a 5.8 pH and a 21.6 Bé. specific gravity of 76° F.

Part 1

This part of the above, diluted, starch slurry was filtered into a clean vessel. Then 600 cc. of the filtrate was mixed with 0.5 gram mol sodium sulfate (71.0 grams) and 0.375 gram mol sodium hydroxide (15.0 grams) in two liters of water. The filter cake is then reslurried in the mixture. Twenty-five mls. of the resultant starch slurry had an alkalinity equivalent to 21.8 mls. of 0.1 N acid per 25 mls. of slurry and a pH of 11.3.

At 74° F., 0.2 mol propane sulfone (24.4 grams) was dripped into the slurry. The reaction mixture was allowed to react at ambient temperature (about 74° F.) for 17.5 hours. The resultant slurry had an alkalinity equivalent to 11.6 mls. of 0.1 N acid per 25 mls. of slurry and a pH of 10.9.

The resultant slurry when then adjusted to pH 6.0 with 6 N HCl. It was twice filtered, and after each filtration the filter cake was reslurried in two liters of water. It was again filtered and reslurried in one liter of distilled water, filtered again, and the filter cake was dried.

Part 2

This portion was processed in the same manner as Part 1 except that 0.3 mol CaO (16.8 grams) was slurried in 100 cc. water instead of the sodium hydroxide in two liters of water. The sodium sulfate was omitted. The slurry just before the pH adjustment to pH 6.0 had, for 25 mls. of slurry, an alkalinity equivalent to 41.4 mls. 0.1 N acid and a pH of 11.3.

Part 3

This portion was processed in the same manner as

Part 2, substituting 0.3 mol strontium hydroxide (79.74 grams) for the CaO. The slurry just before the pH adjustment to pH 6.0 had, for 25 mls. of slurry, an alkalinity equivalent to 42.4 mls. 0.1 N acid and a pH of 11.4.

Part 4

This portion was processed in the same manner as Part 2, substituting 0.3 mol barium hydroxide (94.65 grams) for the CaO. The slurry just before the pH adjustment to pH 6.0 had, for 25 mls. or slurry, an alkalinity equivalent to 42.4 mls. 0.1 N acid and a pH of 11.4.

Part 5

This portion was the starch blank filtered and dried as described in Part 1.

The five parts were evaluated, the results of which are tabulated below:

TABLE

| Observation | Part 1 | Part 2 | Part 3 | Part 4 | Part 5 |
|---|---|---|---|---|---|
| Oven dry solids, percent | 83.74 | 79.07 | 85.17 | 86.26 | 87.14 |
| Ash, percent dry basis | 0.83 | 0.97 | 1.56 | 1.91 | 0.10 |
| Nitrogen, percent dry basis | 0.05 | 0.06 | 0.05 | 0.05 | 0.06 |
| Sulfur, percent dry basis | 0.16 | 0.23 | 0.21 | 0.20 | 0.007 |
| S/100 AGU | 1.32 | 1.97 | 1.81 | 1.71 | 0.06 |
| Reaction efficiency, percent | 24.6 | 36.0 | 32.8 | 31.3 | 0.01 |
| Scott 0.115 AGU/50/sec | 22.2/50/62 | 23.5/50/44 | 21.8/50/56 | 21.6/50/61 | 21.3/50/94 |
| pH Scott paste | 6.6 | 7.0 | 6.9 | 6.8 | 6.5 |
| Cold Scott paste | (¹) | (¹) | (¹) | (¹) | (²) |

¹ Clear, fluid.   ² Opaque gel.

In the table, S/100 AGU indicates mols of sulfur per 100 anhydroglucose units. The reaction efficiency is expressed in percentage and is calculated by dividing S/100 AGU by 3.24 and multiplying by 100. The Scott 0.115 AGU/50/sec. entry is a standard viscosity determination obtained by slurrying 18.646 grams of the respective starches in 280 cc./s. of water, stirring, and heating on a steam bath for 15 minutes. The first entry is the grams of the respective starch product needed to give 0.115 AGU. The second entry indicates the volume in cc. of the respective starch product used in the viscosity determination. The third entry is the number of seconds required for flow of the 50 ccs. of starch in the Scott viscosity determination.

The specific gravity of the slurries prior to and after the sultone-starch reaction in Parts 2–4 was in the range of about 21–22° Bé. It was necessary to keep the specific gravity of the slurries in Part 1 at a lower value (about 13.7° Bé.) because the sodium hydroxide will gelatinize the starch granules if the Baumé is much greater than 13.7, even with the sodium sulfate present.

It is to be particularly noted from the above table that the reaction efficiency in reactions conducted wtih the alkaline earth bases was considerably better than the reaction efficiency for the reaction wherein the alkalinity was provided by the sodium hydroxide. Other preparations using magnesium oxide, potassium carbonate and sodium carbonate gave reaction efficiencies of 10.9%, 4.7% and 6.3% respectively, and therefore were of no practical value.

The invention is hereby claimed as follows:

1. A process for making a starch derivative which comprises reacting ungelatinized starch in aqueous slurry with sultone selected from the group consisting of lower alkyl sultones and aryl sultones in the presence of an alkaline earth metal base at a pH of 10–12 and a temperature in the range of 35–120° F. at a ratio of 1.5 to 5 mols of said sultone per 100 anhydroglucose units and 0.8–3 mol equivalents of said alkaline earth metal base per mol of reacted sultone.

2. A process as claimed in claim 1 wherein said alkaline earth metal base is calcium hydroxide and said sultone is propane sultone.

3. A process as claimed in claim 1 wherein said alkaline earth metal base is barium hydroxide and said sultone is propane sultone.

4. A process as claimed in claim 1 wherein said alkaline earth metal base is strontium hydroxide and said sultone is propane sultone.

5. A product obtained by the process of claim 1.

6. A product obtained by the process of claim 1 in which said alkaline earth metal is calcium.

7. A product obtained by the process of claim 1 in which said alkaline earth metal is strontium.

8. A product obtained by the process of claim 1 in which said alkaline earth metal is barium.

9. A product obtained by the process of claim 1 in which said alkaline earth metal is calcium and said sultone is propane sultone.

10. A product obtained by the process of claim 1 in which said alkaline earth metal is strontium and said sultone is propane sultone.

11. A product obtained by the process of claim 1 in which said alkaline earth metal is barium and said sultone is propane sultone.

References Cited

UNITED STATES PATENTS 3,046,272   7/1962   Stratling et al. _____ 260—233.3
2,660,577   11/1953  Kerr _____ 260—233.5

DONALD E. CZAJA, *Primary Examiner.*

R. W. MULCAHY, *Assistant Examiner.*

U.S. Cl. X.R.

106—213